United States Patent [19]
Ebner et al.

[11] Patent Number: 5,894,358
[45] Date of Patent: Apr. 13, 1999

[54] ADAPTABLE COLOR DENSITY MANAGEMENT SYSTEM

[75] Inventors: Fritz F. Ebner; Nagesh H. Narendranath, both of Rochester, N.Y.

[73] Assignee: Xerox Corporation, Stamford, Conn.

[21] Appl. No.: 08/671,386

[22] Filed: Jun. 27, 1996

[51] Int. Cl.[6] .................................................. G03F 3/08
[52] U.S. Cl. ..................... 358/529; 358/515; 358/518
[58] Field of Search ................................. 358/515, 518, 358/501, 502, 503, 529; 395/101, 109; 347/1, 3, 78

[56] References Cited

U.S. PATENT DOCUMENTS

| | | | |
|---|---|---|---|
| 4,482,917 | 11/1984 | Gaulke et al. | 358/80 |
| 4,649,500 | 3/1987 | Yamada et al. | 358/502 |
| 4,893,177 | 1/1990 | Tada et al. | 358/515 |
| 4,930,018 | 5/1990 | Chan et al. | 358/298 |
| 5,305,119 | 4/1994 | Rolleston et al. | 358/522 |
| 5,353,387 | 10/1994 | Petschik et al. | 395/109 |
| 5,425,134 | 6/1995 | Ishida | 395/109 |
| 5,515,479 | 5/1996 | Klassen | 395/109 |
| 5,563,985 | 10/1996 | Klassen et al. | 395/109 |
| 5,649,071 | 7/1997 | Klassen et al. | 395/109 |

OTHER PUBLICATIONS

Publication entitled "Reducing Ink Coverage Levels in Binary CMYK Images" by R. Victor Klassen. IS&T's 46th Annual Conference (1993) p. 173.

Primary Examiner—Thomas D. Lee

[57] ABSTRACT

A method and system for determining an equal amount of a plurality of color densities to be removed in rendering a multicolor image using a black toner and the plurality of colored toners. The rendering of the multicolor image is executed with a multicolored digital inputs according to undercolor removal techniques. The includes providing a black toner coverage bit count and a total colored toner coverage bit from a plurality of colored toners (often cyan, magenta and yellow) to be used in rendering the multicolored image. The black toner and colored toner coverage estimations are summed; if this sum exceeds a predetermined maximum total toner density level, an equal amount R of toner to be removed from each colored toner separation is determined by subtracting the predetermined maximum from the sum of the black and colored toner estimations, and then dividing the result by the number of colored toner used to produce gray (again, usually 3-cyan, magenta and yellow).

12 Claims, 4 Drawing Sheets

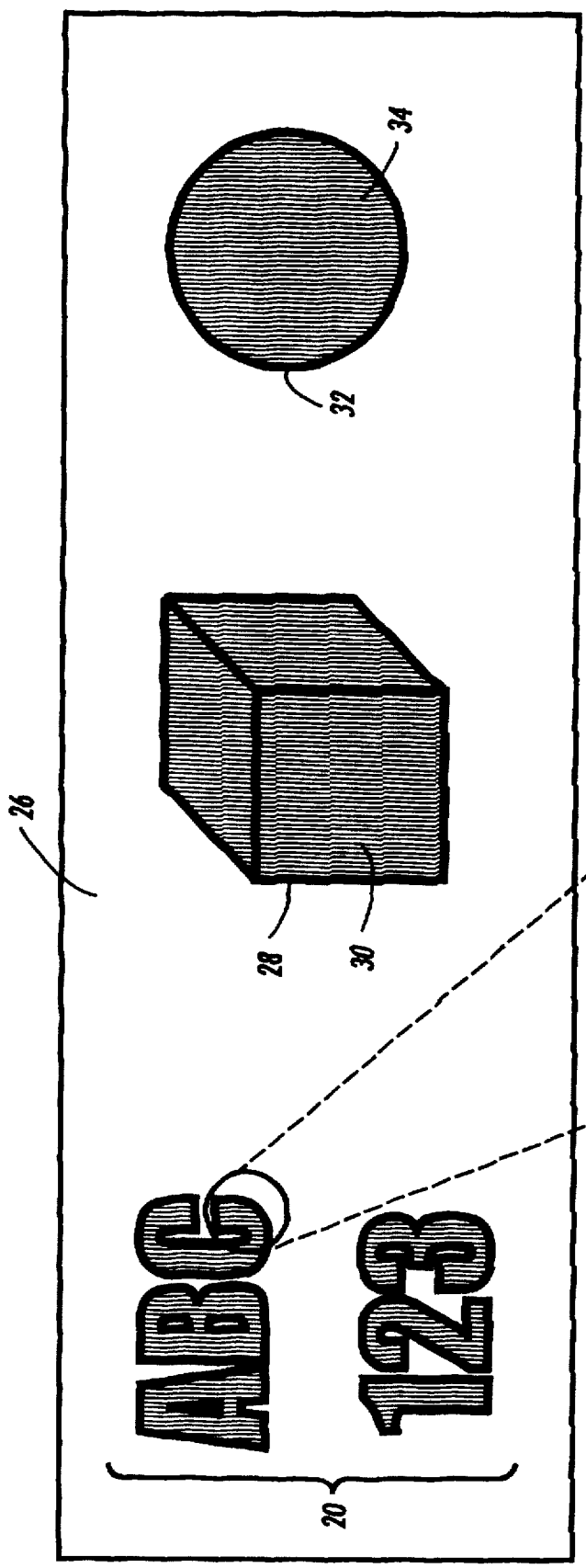
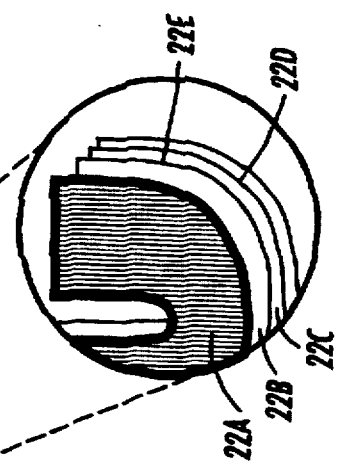
FIG. 2
FIG. 2A

ADAPTABLE COLOR DENSITY MANAGEMENT SYSTEM

The present invention relates to a digitized rendering system as may be used in black and white or color printing systems (such as in electrophotographic and ink-jet printers and copiers), and more particularly, to an apparatus and method for improving black and white or color output image quality according to selective print operator manipulation rendering techniques.

In the operation of a copier or printer, particularly color machines, it is highly desirable to have means for variably processing and enhancing text, graphical and pictorial image quality (hereinafter referred to as "image quality" or the like unless otherwise noted). Particularly in the case of single or multi-pass color printers, it is highly desirable that an image processing system be employed to reduce imaging problems caused by rendering systems not suited to a variety of image types. Likewise, certain image processing systems may be more successfully employed in particular printer hardware situations. While the present invention is quite suitable for use on the Xerox 4900 family of printers in which aspects of it have been tested, it may be likewise highly useful with a variety of other xerographic as well as non-xerographic printing systems such as ink-jet or other printing techniques.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carriergranules, such as ferromagnetic granules. In many instances, three, four or more colors of toner particles may be used. Typically, cyan, magenta, yellow and black are used in four color systems; other colors may be used in addition to or in place of these colors in order to expand, modify or improve the available color gamut that one or more toners in combination can produce. When appropriate, toner particles are mixed with carrier granules and the toner particles are charged triboelectrically to the correct polarity. As the developer mix is brought into contact with the electrostatic latent image, the toner particles adhere thereto. Non-xerographic systems (such as ink-jet) may be more or less successful in printing high quality images of varying types in and may involve capabilities and/or efficiencies unlike those found in xerographic systems.

Various systems have been employed to include those set forth in the following disclosures which may be relevant to various aspects of the adaptable color density management systems of the present invention:

U.S. Pat. No. 5,515,479

Patentee: Klassen

Issued: May 7, 1996

U.S. Pat. No. 5,353,387

Patentee: Petschik et al.

Issued: Oct. 4, 1994

U.S. Pat. No. 5,305,119

Patentee: Rolleston et al.

Issued: Apr. 19, 1994

U.S. Pat. No. 4,930,018

Patentee: Chan et al.

Issued: May 29, 1990

U.S. Pat. No. 4,482,917

Patentee: Gaulke et al.

Issued: Nov. 13, 1984 Publication entitled "Reducing Ink Coverage Levels in Binary CMYK Images" by R. Victor Klassen, Xerox Webster Research Center, IS&T's 46th Annual Conference (1993) p. 173

U.S. Pat. No. 5,515,479 discloses a method for processing images for printing including the steps of for each separation, making a pixel level determination of marking material coverage, based on the number of pixels within a given area that are turned on; if a determination is made that too much marking material will be placed within the given area, turning off a fraction of pixels in the area to reduce the amount of marking material that will be used for the given area and to preventing artifacts from occurring in the pixel reduction step by utilizing a processing order through each given area which tends to randomize the turn off effect.

U.S. Pat. No. 5,353,387 discloses a method reducing the quality of the actual number of pixels to be printed to attain a given resolution, on average, by half, with each two or pair of adjacent pixels of the original print information being sequentially processed and a so called white or unprinted pixel. The arrangement of print pixels and white pixels is effected so as to print a checkerboard pattern. The ink droplets accordingly have the smallest possible substrate or print media contact area so that adjacent ink droplets which are not yet dry are effectively prevented from running together and thereby degrading the resulting images U.S. Pat. No. 5,305,119 discloses a printer which uses cyan, magenta, yellow and black toners to create images. A black addition process is user to perform undercolor removal; calibrated gray balancing, color correction transformation using a tailored look-up table are accomplished to render four color outputs.

U.S. Pat. No. 4,930,018 discloses a method for reducing "grainyness" or color contrast in color imaging systems and simultaneously reducing or eliminating paper cockling of media printed by ink jet printing. The method involves determining the maximum allowable ink print density necessary to reduce or eliminate paper cockleing in the printed media and then providing tight control of the selection of gray scale ink drop count and associated dye loading in relation to this maximum allowable print density. Using this method, pixels are selected and printed in such a manner as to maximize the uniformity of ink distribution on the printed media.

U.S. Pat. No. 4,482,917 discloses a method of undercolor removal in cyan, magenta, yellow and black printing. Color reduction is done in the "gray area" and "chromatic areas" of a master. In the chromatic area of the master, color reduction is matched to the respective maximum mean and minimum value of the three chromatic printing signals (cyan, magenta and yellow).

The article "Reducing Ink Coverage Levels in Binary CMYK Images" describes a system for tuning off a fraction of pixels to avoid excess toner coverage levels according to a system of selectively turning off pixels in relevant regions.

In accordance with one aspect of the present invention, there is provided a method of determining a bit count R of a plurality P of gray component-providing colored toners to be removed before rendering a multicolor image with a black toner and the plurality of colored toners, with the rendering of the multicolor image being executed according to multicolored digital inputs including to undercolor removal techniques. The method includes the steps of: providing a black toner coverage bit count K and a total colored toner coverage bit count T, the total colored toner coverage bit count T including an individual color separation bit count associated with each of the plurality of colored toners to be used in rendering the multicolored image; setting a maximum M total toner bit count toner density level for all toners to be used to render the multicolored image at a particular location; determining said bit count amount R according to the equation R=(K+T−M)/P; subtracting any positive total amount R from each of the individual color separation bit counts to obtain a set of modified individual color separation bit counts; and the rendering the multicolor image according to said black toner coverage bit count K and said set of modified individual color separation bit counts.

In accordance with another aspect of the present invention, there is provided a printing system for rendering a multicolor images according to multicolored digital inputs. The system includes a controller for determining a bit count R of a plurality P of gray component-providing colored toners to be removed before with a black toner and the plurality of colored toners, a bit counter for determining a black toner coverage bit count K and a total colored toner coverage bit count T, with the total colored toner coverage bit count T including an individual color separation bit count associated with each of the plurality of colored toners to be used in rendering the multicolored image. The system further includes a memory for storing a maximum M total toner bit count toner density level for all toners to be used to render the multicolored image at a particular location, a processor for determining said bit count amount R according to the equation R=(K+T−M)/P, wherein the processor thereafter subtracting any positive total amount R from each of said individual color separation bit counts to obtain a set of modified individual color separation bit counts; and a print engine for rendering the multicolor image according to the black toner coverage bit count K and the set of modified individual color separation bit counts.

Other features of the present invention will become apparent as the following description proceeds and upon reference to the drawings, in which:

FIGS. 2 and 2A show an exemplary four colored printed output;

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 4:
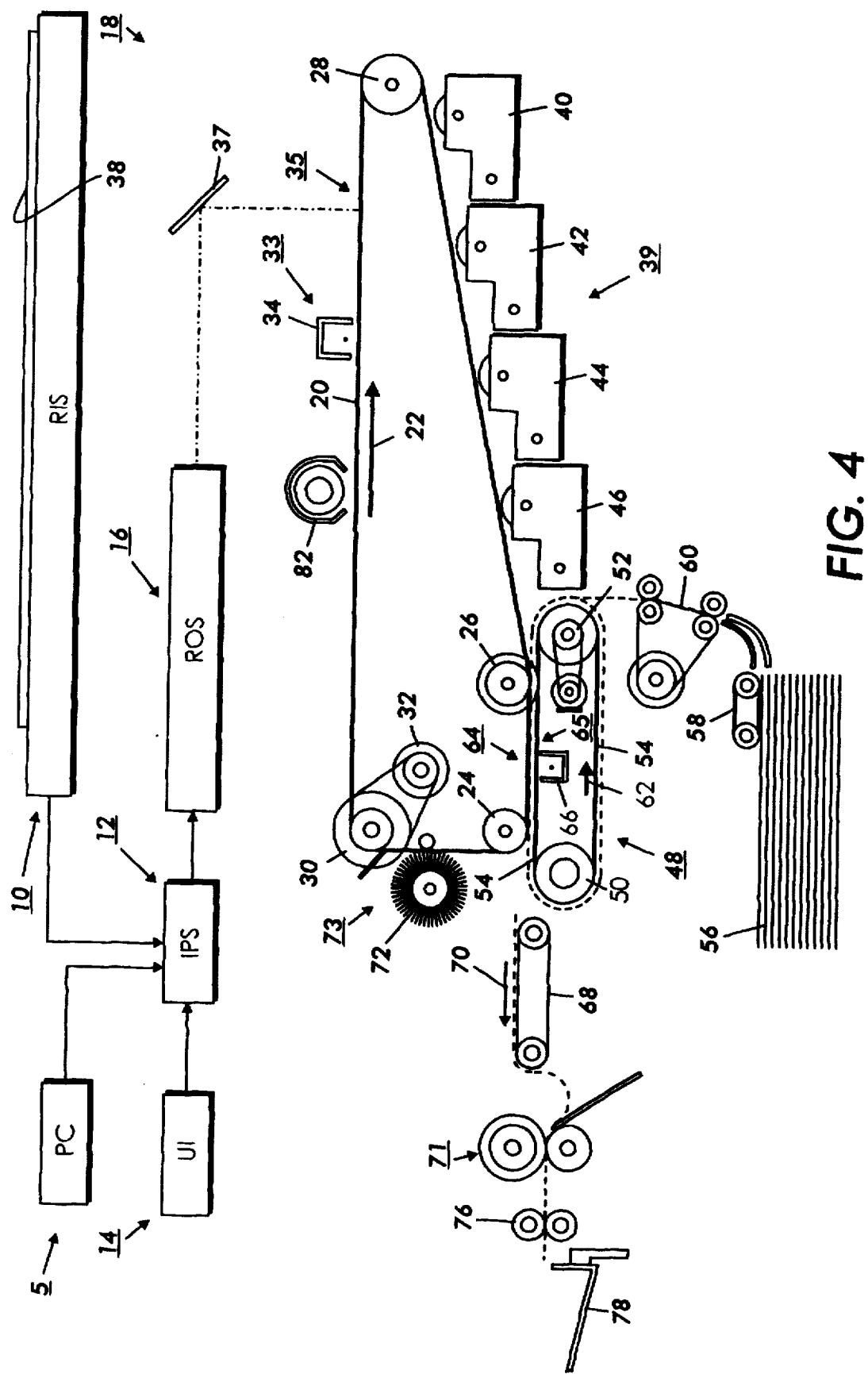
FIG. 4 is a schematic elevational view showing an exemplary color xerographic printing/copying machine and networked PC incorporating features of the present invention therein.

For a general understanding of the features of the present invention, reference is made to the drawings. FIG. 4 is a schematic elevational view showing an exemplary electrophotographic printing/copying machine (such as a Xerox 5775) and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 4), as well as carry out the image rendering selections in accordance with the present invention as described in association with FIGS. 1 through 4 below.

As further shown in FIG. 4, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 4) required to perform the adaptive color density management system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300×1200 dpi, both configurations of which are employed in versions of the Xerox 4900 printer family.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 4, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 4) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 4) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the hybrid imaging systems of the present invention, such as in the case of versions of the Xerox 4900 printer (which employs an intermediate transfer system) in which certain aspects of the system as outlined below have been tested.

Figure 1:
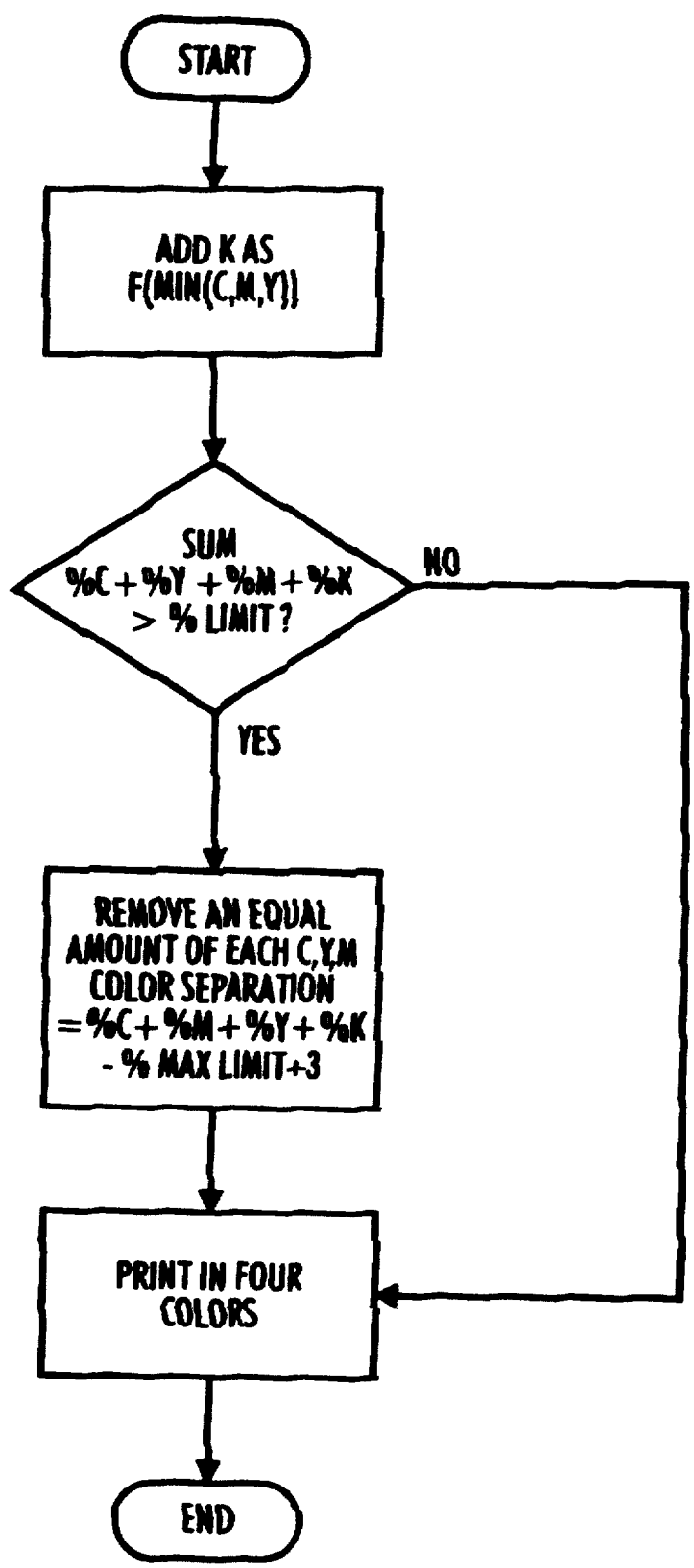
FIG. 1 is a flowchart showing the exemplary system of the present invention.
Figure 3:
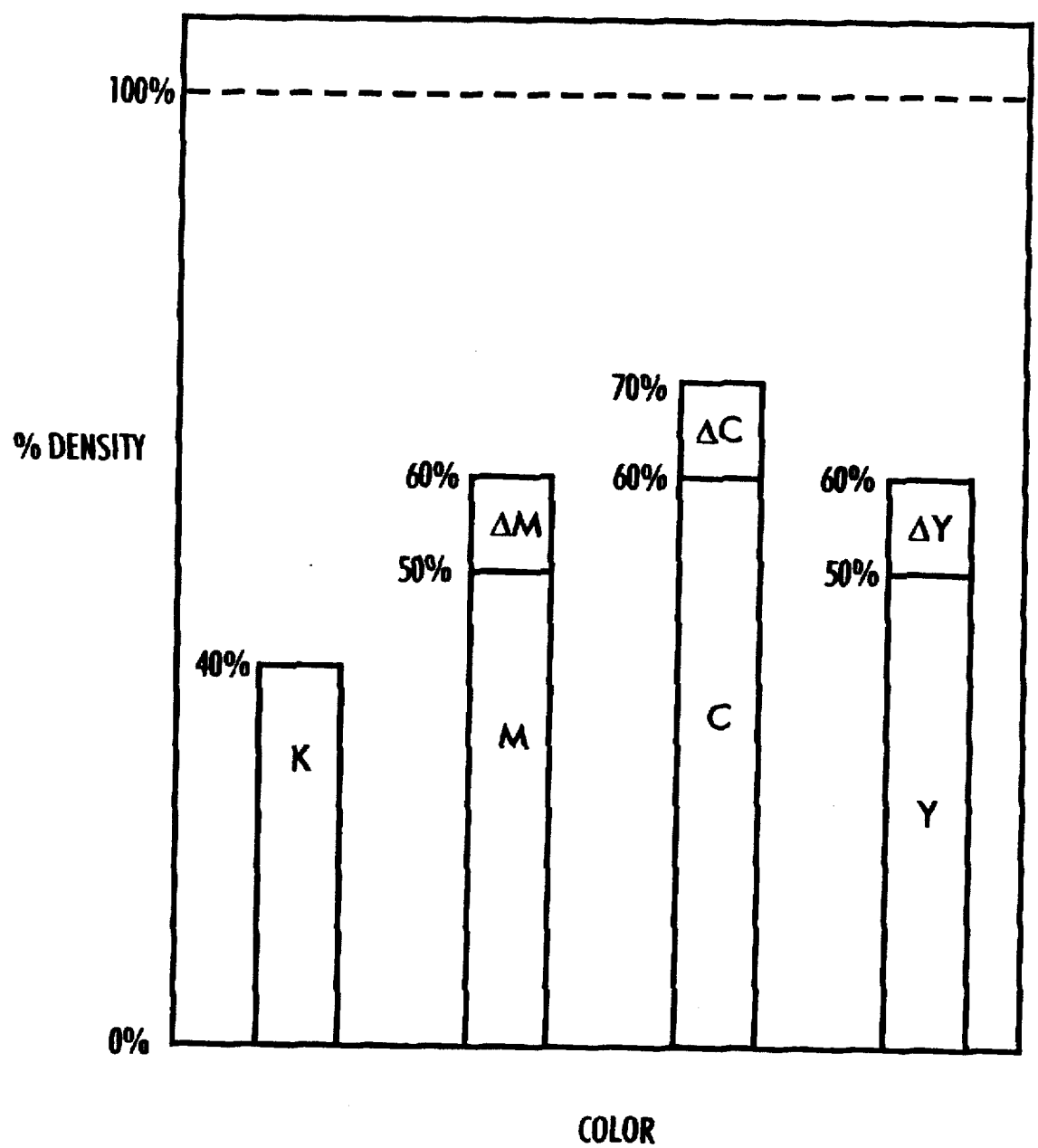
FIG. 3 is an diagram illustrating exemplary color density reductions for each C, M, Y separation in accordance with the system of the present invention.

In conjunction with FIGS. 1 through 3, the present invention will be generally be described in terms of its application to and execution by a printer or copier (and its ESS, networked PC and related systems) such as described above in association with FIG. 4. The descriptions that follow in association with FIGS. 1 through 3 describe aspects of the present invention as may be implemented in a multicolor print engine.

Printers typically render outputs in four colors (such as the C, M, Y, K printer shown in FIG. 4). In particular, the usual CMYK toner colors are uniquely selected due to their ability to produce a broad gamut of vibrant color combinations. Many such color printers operate by the addition of multiple layers of these inks or toner colorants in layers or halftone dots to a page according to (often) non-linear responses. Thus, while a printer receives information in a first color space which has values defined device independent color values, it must convert that information to print in a second color space which is dependent of device characteristics.

FIG. 1 is a flow chart of the system of the present invention which permits enhanced color rendering while insuring that important device maximum toner densities are not exceeded. The effective use of the present invention permits straightforward yet effective management of black addition (K+) and undercolor removal (termed "UCR" or at times "gray component replacement" or "GCR"). The UCR process includes determining how much CMY ink to remove after a specified amount of black ink (K+) has been added to the same color. The concept of UCR involves the replacement of some of the CMY toner or ink with black ink, which may also be described as C, M, Y minimization. This replacement of some of the CMY toner or ink with black ink can permit extension of the color gamut of a printer, which aids in the production of sharper, clearer looking, and otherwise enhanced output images. At the same time, UCR can be used to reduce the total amount of toner or ink on the page. In many color xerographic printing applications, particularly high total toner coverages (also termed as "toner pile height" problems) may be required in certain areas that might result in machine failures (discussed above), thereby requiring that a portion or fraction of the toner not be printed. See U.S. Pat. No. 5,515,479, incorporated herein by reference.

Typically, the undercolor removal and black generation functions provide a needed limitation as long as the maximum percentage of colorant in an area is above 200% (maximum colorant in an area is defined to be 400%, i.e. 100% of each of the four colorants) in xerographic printers. Undercolor removal and black addition functions can be expressed as the following functions of the minimum of the three color components (cyan, magenta, yellow), generally illustrated as $K+=f1(min(c,m,y))$ or as $UCR=f2(min(c,m,y))$. The upper colorant limit may in certain cases be desirably maximized in order to make the most vivid possible reds, greens and blues from appropriate combinations of cyan, magenta and yellow. Thereafter, the total percentage of coverage are compared to a maximum coverage limit (such as for example what might be a 220% coverage) for the printer hardware. If the summation of the total color percentages exceeds the limit an equal percentage of cyan, magenta and yellow are removed from each of the cyan, magenta and yellow separations. The total amount of C, M, Y (color) to be removed is thereby subtracted from the maximum limit and divided by 3, to determine the precise amount of color removed from each of the cyan, magenta and yellow separations.

As described above, the performance capabilities and tendencies of printing devices can place important restraints on the amount of toner that can be applied to an area of an output sheet. Excessive toner coverage (such as more than approximately 220% in the Xerox 4900 laser printer tested in conjunction with the present invention) or in other printing devices such as the system shown in FIG. 4, can cause cleaning, fusing, development and many other machine failures. Because of these limitations in the output device or other considerations, the maximum amount of toner developed in a given area must be constrained. Undercolor removal and black generation functions can provide a needed limitation, as long as they too are properly constrained such as in accordance with the present invention.

An example of one such traditional black addition (K+) strategy is that of adding no black up until some minimum density, and then slowly adding more black as the density of the requested color increases. FIG. 1 shows an undercolor removal strategy that allows a larger color gamut than conventional approaches while guaranteeing a stringent maximum area coverage constraint. While these traditional undercolor removal and black generation strategies generally call for the addition of black and the removal of equal amounts of color as a function of the minimum of the three colored primaries. In contrast, the present invention adds black as a function of the minimum of the three color primaries but removes c,m,y as a function of the sum of all four components. In this manner the system of the present invention guarantees a maximum area coverage constraint, but allows much more ink/toner colorant to be placed on the page versus the traditional method. As will be described below, the present system calls for the % coverages for C, Y, M and K to be summed; undercolor removal calibration is not performed explicitly, but as part of the look up table inversion.

The amount of color (C, M, Y, K) present in an image to be rendered can be calculated by using a table in memory that is a (usually nonlinear) function of applied toner density levels according to the digital bit count associated with a particular color separation. The density of each color separation may be derived from a variety of bit count, gray level measurement of other density coverage determining or estimating methods (such as the systems and methods described in U.S. application Ser. No. 08/253,796 assigned to Xerox, which is incorporated herein by reference.) Further, this bit count system can be used for a number of functions in the machines, such as to also predict toner consumption/coverage as described in the aforementioned patent application.

UCR and GCR as functions of the minimum are undesirable when the device must operate under a tight maximum area constraint because the resultant gamut of dark colors is reduced drastically. Furthermore, when attempting to perform UCR/GCR that is not 100% of both components, the calibration step that maps uniformity in lightness along the gray scale cannot directly guarantee maximum area coverage (i.e. must iterate to a solution). The present invention provides for both a maximum area coverage limitation and maximizes the gamut of dark colors.

Again referring to FIG. 1, the system of the present invention includes a K+ strategy that is a smooth function of the minimum of incoming c,m and y as with the traditional methods. The UCR procedure however, limits the maximum area as a function of the sum of c, m,y, and black (added as a min(c,m,y)). As the system starts, black addition (K+) is performed as a function of C, M, Y minimization (stated as "Add K as f(min(C, M, Y))"). Next, a determination is made as to whether the sum of the bit counts associated with each color (C, M, Y, K) in a buffer exceed the maximum toner density limit for the hardware as is associated with that sum of the bit counts. FIG. 1 shows the query for this determination in the form "Sum of % C+% M+% Y+% K>% Limit?" If the determination is negative, printing in fours colors may proceed, without the need to resort to constraining the density of any of the colors.

If the aforementioned FIG. 1 summing determination is made in the affirmative, then in order to constrain the C, M, Y densities, an equal amount R is removed from each C, M, Y separation only (without reduction of K) by subtracting the maximum bit count density limit M from the sum of the of % C+% M+% Y+% K bit count densities, and dividing the result by the number of colors of toner in the system that make up gray (that is, in the case of C, M, Y=3). This step is illustrated in FIG. 1 as "Remove and equal amount of each C, Y, M color separation=% C+% M+% Y+% K –% Max Limit/3". Thereafter, printing in the four C, M, Y, K colors may proceed.

When two of the three C, M, Y are equal to 0%, the system of the present invention would offer no advantage for a 200% coverage limit, as no constraining is required to remain below the 200% density maximum.

In another embodiment of the present invention in which more that the colors C, Y M are used in the system (such as a five color printing system including a shade of orange for enhanced flesh tone rendering), provided that orange color separation contributed no gray component to the system, the amount of color to be removed from each separation might not be considered in the denominator of this step. That is, the orange shade would not be not be considered in the FIG. 1 step "Remove and equal amount of each C, Y, M color separation=% C+% M+% Y+% K–% Max Limit/3, such that the divisor would remain 3.

FIG. 2 shows a sample printed output using the system of the present invention wherein text 20 and graphical objects 28 and 32 are printed. (The dark outlines of the text and each graphic objects are for illustration purposes only, and are not part of the image itself.) FIG. 2A shows an exploded view the color separations that may be used to print images according to four color UCR techniques, namely black (22A), cyan (22B), magenta (22C) and yellow (22D). FIG. 3 is a bar chart showing original black, magenta, cyan and yellow (B, C, M, Y) and relative removed levels of magenta, cyan and yellow according to the system of the present invention. Assuming a 200% bit count coverage limit, FIG. 3 shows how each original color separation bit count density (C=70%, M=60% and Y=60%) are reduced by an equal amount (10%) so as to bring the total coverage density bit count down to the 200% level (K=40%, C=60%, M=50% and Y=50%) from its unconstrained 230% level.

The present invention thereby enables a color gamut sampling system in which the maximum toner coverage is up near, but no higher than the maximum limits for the printer. Below maximum coverage limit, the present invention can to allow more (gamut enhancing) toner/ink to be placed on the page without violating the maximum hardware percent coverage constraint. Since the colors measured at the color gamut boundary are not over the limit, then in accordance with the accuracy of the color correction look up table inversion, the resultant color correction look up table will not produce output colors that are over the maximum limit.

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of determining a bit count R of a plurality P of gray component-providing colored toners to be removed before rendering a multicolor image with a black toner and the plurality of colored toners, said rendering of the multicolor image being executed according to multicolored digital inputs including to undercolor removal techniques, said method comprising:

providing a black toner coverage bit count K and a total colored toner coverage bit count T, said total colored toner coverage bit count T including an individual color separation bit count associated with each said plurality of colored toners to be used in rendering the multicolored image;

setting a maximum M total toner bit count for all toners to be used to render the multicolored image at a particular location;

determining said bit count amount R according to the equation R=(K+T−M)/P;

subtracting a positive total amount R from each of said individual color separation bit counts to obtain a set of modified individual color separation bit counts; and rendering the multicolor image according to said black toner coverage bit count K and said set of modified individual color separation bit counts.

2. The method of claim 1, wherein P=3 and wherein said plurality of colored toners include a cyan toner, a magenta toner and yellow toner.

3. The method of claim 1, wherein said multicolored digital inputs include red color inputs, blue color inputs and green color inputs.

4. The method of claim 1, wherein the maximum toner bit count M is set at 200% of a total possible applied coverage area of said black toner.

5. The method of claim 1, wherein said black toner coverage bit count K and said individual color separation bit counts associated with each said plurality of colored toners are determined according to a set of lookup table entries in a memory for predicting toner coverage levels.

6. The method of claim 1, wherein said black toner coverage bit count K and said set of modified individual color separation bit counts are summed so as to provide an estimated toner usage report for predicting an aggregate amount of each toner used in a printer at a designated point in time.

7. A printing system for rendering a multicolor images according to multicolored digital inputs, comprising
 a controller for determining a bit count R of a plurality P of gray component-providing colored toners to be removed before with a black toner and the plurality of colored toners;
 a bit counter for determining a black toner coverage bit count K and a total colored toner coverage bit count T, said total colored toner coverage bit count T including an individual color separation bit count associated with each said plurality of colored toners to be used in rendering the multicolored image;
 a memory for storing a maximum M total toner bit count for all toners to be used to render the multicolored image at a particular location;
 a processor for determining said bit count amount R according to the equation R=(K+T−M)/P, said processor thereafter subtracting a positive total amount R from each of said individual color separation bit counts to obtain a set of modified individual color separation bit counts; and
 a print engine for rendering the multicolor image according to said black toner coverage bit count K and said set of modified individual color separation bit counts.

8. The system of claim 7, wherein P=3 and wherein said plurality of colored toners include a cyan toner, a magenta toner and yellow toner.

9. The method of claim 7, wherein said multicolored digital inputs include red color inputs, blue color inputs and green color inputs.

10. The system of claim 7, wherein said memory stores a maximum toner bit count of 200% of a total possible applied coverage area of said black toner.

11. The system of claim 7, wherein said processor determines said black toner coverage bit count K and said individual color separation bit counts associated with each said plurality of colored toners according to a set of lookup table entries in a memory for predicting toner coverage levels.

12. The system of claim 7, wherein said processor sums said black toner coverage bit count K and said set of modified individual color separation bit counts, said processor thereafter providing use report for the aggregate amount of each toner used by the print engine.

* * * * *